United States Patent
Dar et al.

(10) Patent No.: US 12,067,280 B2
(45) Date of Patent: Aug. 20, 2024

(54) SYSTEMS AND METHODS OF FORECASTING TEMPERATURES OF STORAGE OBJECTS USING MACHINE LEARNING

(71) Applicant: Dell Products L.P., Round Rock, TX (US)

(72) Inventors: Shaul Dar, Petach Tikva (IL); Ramakanth Kanagovi, Karnataka (IN); Vamsi K. Vankamamidi, Hopkinton, MA (US); Guhesh Swaminathan, Tamil Nadu (IN); Swati Smita Sitha, Bengaluru (IN)

(73) Assignee: Dell Products L.P., Round Rock, TX (US)

( * ) Notice: Subject to any disclaimer, the term of this patent is extended or adjusted under 35 U.S.C. 154(b) by 133 days.

(21) Appl. No.: 17/847,449

(22) Filed: Jun. 23, 2022

(65) Prior Publication Data
US 2023/0418505 A1 Dec. 28, 2023

(51) Int. Cl.
*G06F 12/00* (2006.01)
*G06F 3/06* (2006.01)
*G06N 20/00* (2019.01)

(52) U.S. Cl.
CPC .......... *G06F 3/0653* (2013.01); *G06F 3/0604* (2013.01); *G06F 3/0679* (2013.01); *G06N 20/00* (2019.01)

(58) Field of Classification Search
CPC ...... G06F 3/0653; G06F 3/0679; G06N 20/00
See application file for complete search history.

(56) References Cited

U.S. PATENT DOCUMENTS

| | | | |
|---|---|---|---|
| 10,402,733 B1 | 9/2019 | Li et al. | |
| 10,599,992 B1 | 3/2020 | Cohen et al. | |
| 11,176,034 B2 | 11/2021 | Vankamamidi et al. | |
| 11,176,488 B2 | 11/2021 | Gottin et al. | |
| 11,269,541 B2 | 3/2022 | Savir et al. | |
| 2022/0342578 A1* | 10/2022 | Chen | G06F 3/0653 |
| 2023/0036528 A1* | 2/2023 | Vankamamidi | G06F 3/067 |

\* cited by examiner

*Primary Examiner* — John A Lane
(74) *Attorney, Agent, or Firm* — BainwoodHuang

(57) ABSTRACT

Techniques for forecasting temperatures of storage objects in a storage system using machine learning (ML). The techniques can include forecasting at least one temperature of a storage object using at least one ML model, modifying storage of the storage object based on the at least one temperature of the storage object, and, having modified storage of the storage object, obtaining at least one performance metric associated with the storage object. The techniques can further include, based on the performance metric(s), varying a frequency of forecasting the at least one temperature of the storage object, retraining the at least one ML model used in forecasting the at least one temperature, and/or adjusting at least one operational parameter of the system. The techniques provide increased accuracy over known statistical approaches to forecasting temperatures of storage objects, leading to increased performance gains in terms of IO latency, IO operations per second, and bandwidth.

20 Claims, 4 Drawing Sheets

SYSTEMS AND METHODS OF FORECASTING TEMPERATURES OF STORAGE OBJECTS USING MACHINE LEARNING

BACKGROUND

Storage systems include storage processors and storage arrays that contain storage devices such as solid-state drives (SSDs) and hard disk drives (HDDs). The storage processors perform input/output (IO) operations in response to requests from storage clients communicably coupled to the storage processors. The IO operations cause data blocks, data files, data pages, or other data elements specified in the requests to be read from or written to volumes, logical units, filesystems, data streams, data extents, data slices, or other storage objects maintained on the storage devices. In their decision-making regarding data tiering in the storage arrays, data prefetching in cache memories, load balancing across clusters of storage systems, data placement and/or movement in the "cloud" or combined on-premises/cloud environments, and so on, the storage processors typically base their decisions, at least in part, on the levels of activity (or "temperatures") of the storage objects involved.

SUMMARY

When considering the temperatures of storage objects, storage processors can look at several factors including the number of IO operations (e.g., read IO operations, write IO operations) performed in a given time interval and/or the amount or frequency of data to be accessed in response to requests from storage clients. Storage objects with high levels of activity (i.e., high temperatures) can be regarded as "hot" storage objects, while storage objects with low levels of activity (i.e., low temperatures) can be regarded as "cold" storage objects. For example, in a storage system with a two-tiered storage array, storage processors can reduce IO latency by placing hot storage objects in an upper storage tier that uses high-speed SSDs and placing cold storage objects in a lower storage tier that uses low-speed HDDs. Storage processors can further reduce or substantially hide IO latency by prefetching hot storage objects in internal cache memories. In addition, by forecasting or predicting future levels of activity or temperatures of storage objects, storage processors can obtain performance gains in terms of IO latency, IO operations per second (IOPS), and/or bandwidth. For example, storage processors can use statistical approaches such as a simple moving average, a weighted moving average, and/or an exponential moving average to forecast or predict future temperatures of storage objects.

Techniques are disclosed herein for forecasting temperatures of storage objects in a storage system using machine learning (ML). The disclosed techniques can include forecasting at least one temperature of a storage object using at least one ML model, which can correspond to a supervised regression model generated using one or more ML algorithms such as a random forest algorithm, a gradient boosting algorithm, and/or any other suitable ML algorithm. In a given time interval, a plurality of temperatures of the storage object can be forecasted and defined in terms of the total number of IO operations per second (IOPS) performed on the storage object, the number of read IOPS performed on the storage object, the number of write IOPS performed on the storage object, the total bandwidth (B/W) associated with the storage object, the read B/W associated with the storage object, and/or the write B/W associated with the storage object. The disclosed techniques can further include modifying storage of the storage object based on the forecasted plurality of temperatures and, having modified the storage of the storage object, obtaining at least one performance metric associated with the storage object. The storage of the storage object can be modified using one or more storage optimization techniques such as data tiering and/or data prefetching. The disclosed techniques can further include, based on the performance metric(s), varying the frequency of forecasting the plurality of temperatures of the storage object, retraining one or more of the ML algorithms used to generate the ML models, and/or adjusting at least one operational parameter of the storage system. The disclosed techniques can provide increased accuracy over known statistical approaches to forecasting temperatures of storage objects, leading to increased performance gains in terms of IO latency, IO operations per second, and/or bandwidth.

In certain embodiments, a method includes forecasting at least one temperature of a storage object using at least one machine learning (ML) model, and modifying storage of the storage object based on the at least one forecasted temperature of the storage object. The method further includes, having modified storage of the storage object, obtaining at least one performance metric associated with the storage object, and based on the at least one performance metric, performing one or more of varying a frequency of forecasting the at least one temperature of the storage object, retraining the at least one ML model used in forecasting the at least one temperature, and adjusting at least one operational parameter of the storage system.

In certain arrangements, the method includes forecasting a plurality of temperatures of the storage object using a plurality of ML models, respectively.

In certain arrangements, the method includes producing a plurality of target variables by the plurality of ML models, respectively. The plurality of target variables correspond to the plurality of temperatures of the storage object, respectively. The plurality of target variables further correspond to a plurality of temperature definitions, respectively, in which each temperature definition defines a different manner of expressing a temperature of a storage object.

In certain arrangements, one or more input/output (IO) operations are performed on the storage object over a plurality of first time intervals. The method includes, for each IO operation performed on the storage device during each first time interval, updating one or more in-memory counters.

In certain arrangements, the method includes, at an end of each first time interval, generating a plurality of features relevant to the at least one temperature of the storage object by aggregating the updated in-memory counters. The plurality of features include at least a number of IO operations per second (IOPS) performed on the storage object, a number of read IO operations performed on the storage object, and a number of write IO operations performed on the storage object.

In certain arrangements, the plurality of features generated at the end of each first time interval forms an input dataset for the plurality of ML models. The method includes assigning each input dataset to one of a plurality of data buckets, in which each data bucket corresponds to a different range of temperatures of a storage object.

In certain arrangements, the method includes, for each data bucket, training the plurality of ML models using at least some input datasets assigned to the data bucket.

In certain arrangements, the method includes, for each data bucket at an end of each of a plurality of second time intervals, applying input datasets assigned to the data bucket to the plurality of ML models, and producing a plurality of target variables by the plurality of ML models, respectively. The plurality of target variables correspond to the plurality of temperatures of the storage object, respectively. The plurality of target variables further correspond to a plurality of temperature definitions, in which each temperature definition defines a different manner of expressing a temperature of a storage object.

In certain arrangements, the method includes applying one or more storage optimization policies based on the forecasted plurality of temperatures of the storage object.

In certain arrangements, the method includes evaluating the at least one performance metric resulting from application of the one or more storage optimization policies.

In certain embodiments, a system includes a memory and processing circuitry configured to execute program instructions out of the memory to forecast at least one temperature of a storage object using at least one machine learning (ML) model, and to modify storage of the storage object based on the at least one forecasted temperature of the storage object. The processing circuitry is further configured to execute the program instructions out of the memory, having modified storage of the storage object, to obtain at least one performance metric associated with the storage object, and based on the at least one performance metric, to perform one or more of varying a frequency of forecasting the at least one temperature of the storage object, retraining the at least one ML model used in forecasting the at least one temperature, and adjusting at least one operational parameter of the storage system.

In certain arrangements, the processing circuitry is further configured to execute the program instructions out of the memory to forecast a plurality of temperatures of the storage object using a plurality of ML models, respectively.

In certain arrangements, the memory includes a plurality of counters, and one or more input/output (IO) operations are performed on the storage object over a plurality of first time intervals. The processing circuitry is further configured to execute the program instructions out of the memory, for each IO operation performed on the storage device during each first time interval, to update at least some of the plurality of counters.

In certain arrangements, the processing circuitry is further configured to execute the program instructions out of the memory, at an end of each first time interval, to generate a plurality of features relevant to the at least one temperature of the storage object by aggregating the updated plurality of counters. The plurality of features include at least a number of IO operations per second (IOPS) performed on the storage object, a number of read IO operations performed on the storage object, and a number of write IO operations performed on the storage object.

In certain arrangements, the plurality of features further include at least some of:
 a number of non-IO operations performed on the storage object;
 a percentage of a total number of IO operations performed on the storage object that are read IO operations;
 a percentage of a total number of IO operations performed on the storage object that are write IO operations;
 a percentage of a total number of IO and non-IO operations performed on the storage object that are non-IO operations;
 an average size of read IO operations performed on the storage object;
 an average size of write IO operations performed on the storage object;
 a standard deviation of sizes of read IO operations performed on the storage object;
 a standard deviation of sizes of write IO operations performed on the storage object;
 an average time between successive arrivals (or "average interarrival time") of IO operations performed on the storage object;
 an average interarrival time of read IO operations performed on the storage object;
 an average interarrival time of write IO operations performed on the storage object;
 an average difference between start logical block addresses (or "average delta LBA") of successive IO operations performed on the storage object;
 an average delta LBA of successive read IO operations performed on the storage object;
 an average delta LBA of successive write IO operations performed on the storage object;
 a percentage of successive pairs of IO operations performed on the storage object that include two (2) read IO operations;
 a percentage of successive pairs of IO operations performed on the storage object that include a read IO operation followed by a write IO operation;
 a percentage of successive pairs of IO operations performed on the storage object that include a write IO operation followed by a read IO operation;
 a percentage of successive pairs of IO operations performed on the storage object that include two (2) write IO operations;
 a percentage of successive pairs of read IO operations performed on the storage object, in which a start logical block address (LBA) of a second read IO operation immediately follows an end LBA of a first read IO operation; and
 a percentage of successive pairs of write IO operations performed on the storage object, in which a start LBA of a second write IO operation immediately follows an end LBA of a first write IO operation.

In certain arrangements, the plurality of features generated at the end of each first time interval forms an input dataset for the plurality of ML models. The processing circuitry is further configured to execute the program instructions out of the memory to assign each input dataset to one of a plurality of data buckets, in which each data bucket corresponds to a different range of temperatures of a storage object.

In certain arrangements, the processing circuitry is further configured to execute the program instructions out of the memory, for each data bucket at an end of each of a plurality of second time intervals, to apply input datasets assigned to the data bucket to the plurality of ML models, and to produce a plurality of target variables by the plurality of ML models, respectively. The plurality of target variables correspond to the plurality of temperatures of the storage object, respectively. The plurality of target variables further correspond to a plurality of temperature definitions, in which each temperature definition defines a different manner of expressing a temperature of a storage object.

In certain arrangements, the processing circuitry is further configured to execute the program instructions out of the memory to apply one or more storage optimization policies based on the forecasted plurality of temperatures of the storage object, and to evaluate the at least one performance metric resulting from application of the one or more storage optimization policies.

In certain embodiments, a computer program product includes a set of non-transitory, computer-readable media having instructions that, when executed by processing circuitry, cause the processing circuitry to perform a method that includes forecasting at least one temperature of a storage object using at least one machine learning (ML) model, and modifying storage of the storage object based on the at least one forecasted temperature of the storage object. The method further includes, having modified storage of the storage object, obtaining at least one performance metric associated with the storage object, and based on the at least one performance metric, performing one or more of varying a frequency of forecasting the at least one temperature of the storage object, retraining the at least one ML model used in forecasting the at least one temperature, and adjusting at least one operational parameter of the storage system.

Other features, functions, and aspects of the present disclosure will be evident from the Detailed Description that follows.

BRIEF DESCRIPTION OF THE DRAWINGS

The foregoing and other objects, features, and advantages will be apparent from the following description of particular embodiments of the present disclosure, as illustrated in the accompanying drawings, in which like reference characters refer to the same parts throughout the different views.

DETAILED DESCRIPTION

Techniques are disclosed herein for forecasting temperatures of storage objects in a storage system using machine learning (ML). The disclosed techniques can include forecasting at least one temperature of a storage object using at least one ML model, modifying storage of the storage object based on the at least one forecasted temperature and, having modified the storage of the storage object, obtaining at least one performance metric associated with the storage object. The disclosed techniques can further include, based on the performance metric(s), varying a frequency of forecasting the at least one temperature of the storage object, retraining at least one ML algorithm used to generate the at least one ML model, and/or adjusting at least one operational parameter of the storage system. The disclosed techniques can provide increased accuracy over known statistical approaches to forecasting temperatures of storage objects, leading to increased performance gains in terms of IO latency, IO operations per second (IOPS), and/or bandwidth.

Figure 1A:
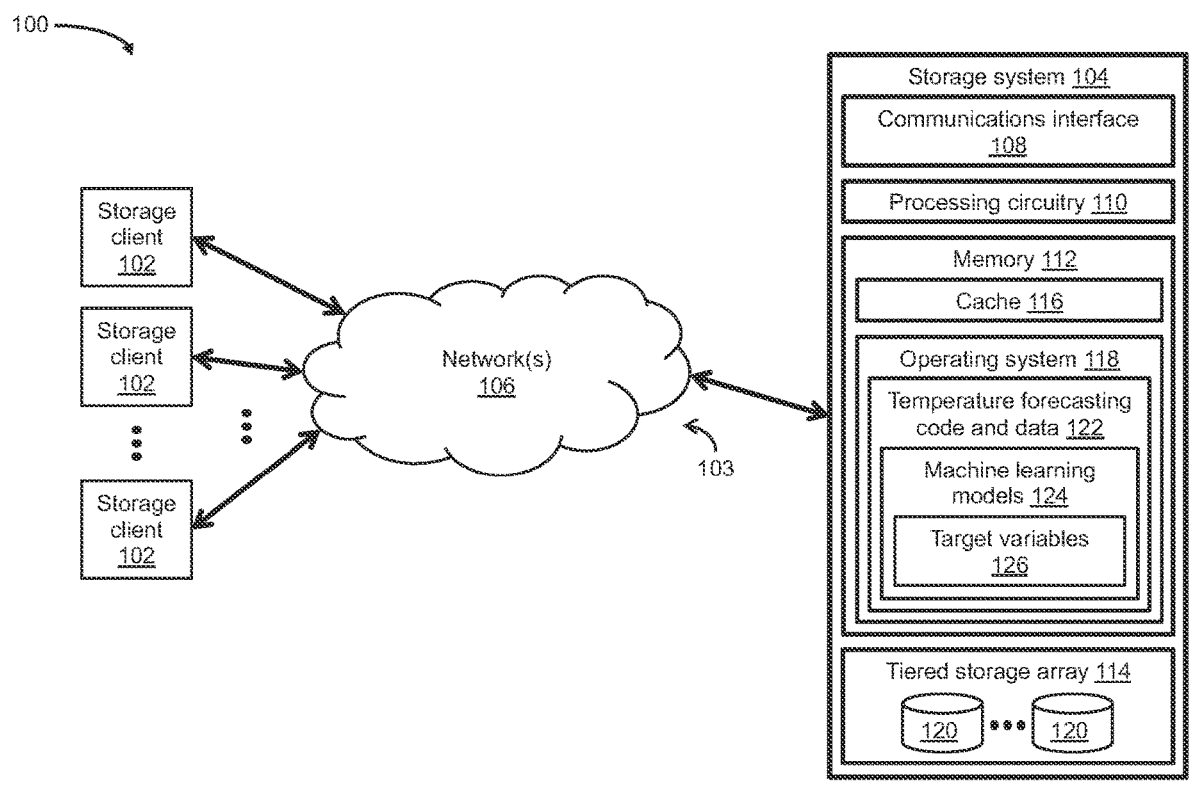
FIG. 1a is a block diagram of an exemplary storage environment, in which techniques can be practiced for forecasting temperatures of storage objects in a storage system using machine learning (ML)

FIG. 1a depicts an illustrative embodiment of an exemplary storage environment 100, in which techniques can be practiced for forecasting temperatures of storage objects in a storage system using machine learning (ML). As shown in FIG. 1a, the storage environment 100 can include a plurality of storage client computers ("storage client(s)") 102 communicably coupled to a storage system 104 by a communications medium 103, which can include at least one network 106. For example, each of the plurality of storage clients 102 may be configured as an email server computer, a file server computer, a web server computer, and/or any other suitable client computer, server computer, or computerized device. The storage clients 102 can be further configured to provide, over the network(s) 106, storage input/output (IO) requests (e.g., small computer system interface (SCSI) commands, network file system (NFS) commands) to the storage system 104. In response to the storage IO requests (e.g., read IO requests, write IO requests), one or more storage processors of the storage system 104 can perform IO operations (e.g., read IO operations, write IO operations) that cause data blocks, data files, data pages, and/or any other suitable data elements specified in the storage IO requests to be read from or written to volumes, logical units, filesystems, data streams, data extents, data slices, and/or any other suitable storage objects maintained on one or more storage devices 120. The storage system 104 can be configured as a stand-alone storage system including a single storage appliance, a clustered storage system including two or more storage appliances, a cloud-based storage system, or any other suitable storage system or appliance.

The communications medium 103 can be configured to interconnect the storage clients 102 with the storage system 104 to enable them to communicate and exchange data and control signaling. As shown in FIG. 1a, the communications medium 103 can be illustrated as a "cloud" to represent different network topologies such as a storage area network (SAN) topology, a network-attached storage (NAS) topology, a direct-attached storage (DAS) topology, a local area network (LAN) topology, a metropolitan area network (MAN) topology, a wide area network (WAN) topology, or any suitable combination thereof. As such, the communications medium 103 can include copper-based data communications devices and cabling, fiber optic devices and cabling, wireless devices, or any suitable combination thereof.

As shown in FIG. 1a, the storage system 104 can include a communications interface 108, one or more storage processors (or, more generally, "processing circuitry") 110, at least one memory 112, and a storage array 114, which can be configured as a tiered storage array or any other suitable storage array. The communications interface 108 can include an Ethernet interface, an InfiniBand interface, a Fiber Channel interface, and/or any other suitable communications interface. The communications interface 108 can further include SCSI target adapters, network interface adapters, and/or any other suitable adapters for converting electronic, optical, and/or wireless signals received over the network(s) 106 to a form suitable for use by the processing circuitry 110.

The processing circuitry 110 can be configured to process storage IO requests (e.g., read IO requests, write IO requests) issued by the plurality of storage clients 102 and store client data in a redundant array of independent disk (RAID) environment implemented on the tiered storage array 114. The tiered storage array 114 can include the storage devices 120 such as solid-state drives (SSDs), hard disk drives (HDDs), flash drives, hybrid drives, optical drives, and/or any other suitable storage drives or devices. The storage devices 120 can be configured to store volumes, logical units, filesystems, data streams, data extents, data slices, and/or any other suitable storage objects for hosting data storage of client applications (e.g., email client applications, file client applications, web client applications) running on the respective storage clients 102.

The memory 112 can include persistent memory (e.g., flash memory, magnetic memory) and non-persistent memory (e.g., dynamic random-access memory (DRAM), static random-access memory (SRAM)) including a cache 116. The memory 112 can store an operating system (OS) 118 such as a Linux OS, Unix OS, Windows OS, or any other suitable operating system, as well as a variety of software constructs realized in the form of specialized code and data such as temperature forecasting code and data 122. As shown in FIG. 1a, the temperature forecasting code and data 122 can include a plurality of machine learning (ML) models 124, which can correspond to a plurality of supervised regression models configured to produce values for a plurality of target (or predictor) variables 126, respectively. As described below with reference to an illustrative example, the plurality of target variables 126 can correspond to a plurality of temperature definitions for storage objects, respectively, each of which can define a different manner of expressing the temperature of a storage object maintained on one or more of the storage devices 120. For example, the plurality of temperature definitions for a storage object may be expressed in terms of the total number of IO operations per second (IOPS) performed on the storage object, the number of read IOPS performed on the storage object, the number of write IOPS performed on the storage object, the total bandwidth (B/W) associated with the storage object, the read B/W associated with the storage object, the write B/W associated with the storage object, and/or any other suitable temperature definition. It is noted that the bandwidth (B/W) associated with a storage object can be expressed in terms of the number of IO operations per second (IOPS), as follows:

$$B/W = IOPS * IO\_SIZE, \quad (1)$$

in which "IO_SIZE" corresponds to the data size (e.g., data block size) specified in the IO operations. The temperature forecasting code and data 122 can be executed by the processing circuitry 110 to carry out the techniques and/or methods disclosed herein.

In the context of the processing circuitry 110 being configured to execute specialized code and data (e.g., program instructions) out of the memory 112, a computer program product can be configured to deliver all or a portion of the program instructions and/or data to the processing circuitry 110. Such a computer program product can include one or more non-transient computer-readable storage media such as a magnetic disk, a magnetic tape, a compact disk (CD), a digital versatile disk (DVD), an optical disk, a flash drive, a solid-state drive (SSD), a secure digital (SD) chip or device, an application specific integrated circuit (ASIC), a field programmable gate array (FPGA), and so on. The non-transient computer-readable storage media can be encoded with sets of program instructions and/or data for performing, when executed by the processing circuitry 110, the various techniques and/or methods disclosed herein.

Figure 1B:
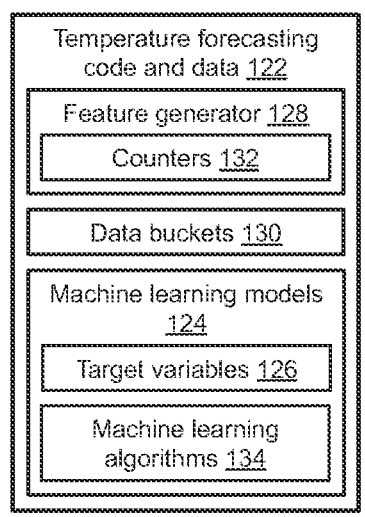
FIG. 1b is a block diagram of exemplary temperature forecasting code and data included in the storage system of FIG. 1a, in which the temperature forecasting code and data includes a feature generator, a plurality of data buckets, and a plurality of ML models.

FIG. 1B depicts a more detailed view of the temperature forecasting code and data 122 stored in the memory 112 of FIG. 1a. As shown in FIG. 1B, the temperature forecasting code and data 122 can include a feature generator 128, a plurality of data buckets 130, and the plurality of machine learning (ML) models 124. The feature generator 128 is configured to generate a plurality of features relevant to the temperature of a storage object maintained on one or more of the storage devices 120. For a storage object over a given time interval, the plurality of features relevant to the temperature of the storage object can include:

the total number of IO operations per second (IOPS);
the number of read IO operations;
the number of write IO operations;
the number of non-IO operations;
the percentage of the total number of IO operations that are read IO operations;
the percentage of the total number of IO operations that are write IO operations; and
the percentage of the total number of IO and non-IO operations that are non-IO operations.

Alternatively, or in addition, for the storage object over the given time interval, the plurality of features relevant to the temperature of the storage object can further include:

the average size of the read IO operations;
the average size of the write IO operations;
the standard deviation of the sizes of the read IO operations;
the standard deviation of the sizes of the write IO operations;
the average time between successive arrivals (or "average interarrival time") of the IO operations;
the average interarrival time of the read IO operations;
the average interarrival time of the write IO operations;
the average difference between start logical block addresses (or "average delta LBA") of successive IO operations;
the average delta LBA of successive read IO operations;
the average delta LBA of successive write IO operations;
the percentage of successive pairs of IO operations that include two (2) read IO operations;
the percentage of successive pairs of IO operations that include a read IO operation followed by a write IO operation;
the percentage of successive pairs of IO operations that include a write IO operation followed by a read IO operation;
the percentage of successive pairs of IO operations that include two (2) write IO operations;
the percentage of successive pairs of read IO operations, in which the start LBA of the second read IO operation immediately follows the end LBA of the first read IO operation; and
the percentage of successive pairs of write IO operations, in which the start LBA of the second write IO operation immediately follows the end LBA of the first write IO operation.

As shown in FIG. 1b, the feature generator 128 can include a plurality of in-memory counters (or simply "counters") 132, which act as temporary variables for generating and/or calculating features relevant to the temperature of a storage object. As described below with reference to the illustrative example, for each IO operation performed on the storage object during successive time intervals (e.g., 5-minute intervals), the feature generator 128 can update (e.g., increment/decrement) the plurality of counters 132. Further, at the end of each 5-minute interval, the feature generator 128 can aggregate the plurality of counters 132, as well as perform feature engineering calculations, as necessary, to obtain the plurality of features relevant to the storage object's temperature. The plurality of features for each storage object maintained on the storage devices 120 form a dataset that can be applied as input to the ML models 124 for producing values for the target variables 126.

It is noted that the heterogeneity of IO access patterns can adversely affect the accuracy of forecasting temperatures of storage objects within the storage system 104. For example, while a majority of the storage objects maintained on the storage devices 120 may be inactive (or cold), i.e., just a few IO accesses may be performed on the storage objects during a given time interval, a smaller minority of the storage objects may be active (or hot), i.e., up to 10,000 IO accesses or more may be performed on the storage objects during the given time interval. To control variability in the datasets and increase the accuracy of temperature forecasting, each dataset can be assigned to one of the plurality of data buckets 130. Further, each data bucket 130 can correspond to a range of temperatures defined in terms of the average total IOPS, the average total B/W, or any other suitable temperature definition for the storage objects. The datasets assigned to each data bucket 130 can be split into training data, validation data, and testing data for one or more machine learning (ML) algorithms 134 used to generate the ML models 124. For example, the ML algorithms 134 may include a random forest algorithm, a gradient boosting algorithm, and/or any other suitable ML algorithm. In this way, the ML models 124 can be optimized for forecasting temperatures across a range of storage object temperatures, leading to improved decision-making regarding storage of the coldest storage objects to the hottest storage objects within the storage system 104.

During operation, the disclosed techniques can forecast temperatures of storage objects within the storage system 104 and modify storage of the storage objects based on the forecasted temperatures. For example, storage objects forecasted to be "hot" may be placed in an upper storage tier of the tiered storage array 114 that uses high-speed SSDs, and storage objects forecasted to be "cold" may be placed in a lower storage tier of the tiered storage array 114 that uses low-speed HDDs. Alternatively, or in addition, storage objects forecasted to be "hot" can be prefetched into the cache 116. Having modified the storage of the storage objects, the disclosed techniques can obtain at least one performance metric associated with the storage objects such as the average IO latency, average IOPS, average bandwidth, and/or any other suitable performance metric. Based on the performance metric(s), the disclosed techniques can vary the frequency of forecasting the plurality of temperatures of the storage object, retrain one or more of the ML algorithms 134 used to generate the ML models 124, and/or adjust at least one operational parameter of the storage system 104. In this way, the disclosed techniques can provide increased accuracy over known statistical approaches to forecasting temperatures of storage objects, leading to increased performance gains in terms of IO latency, IOPS, and/or bandwidth.

Figure 2:
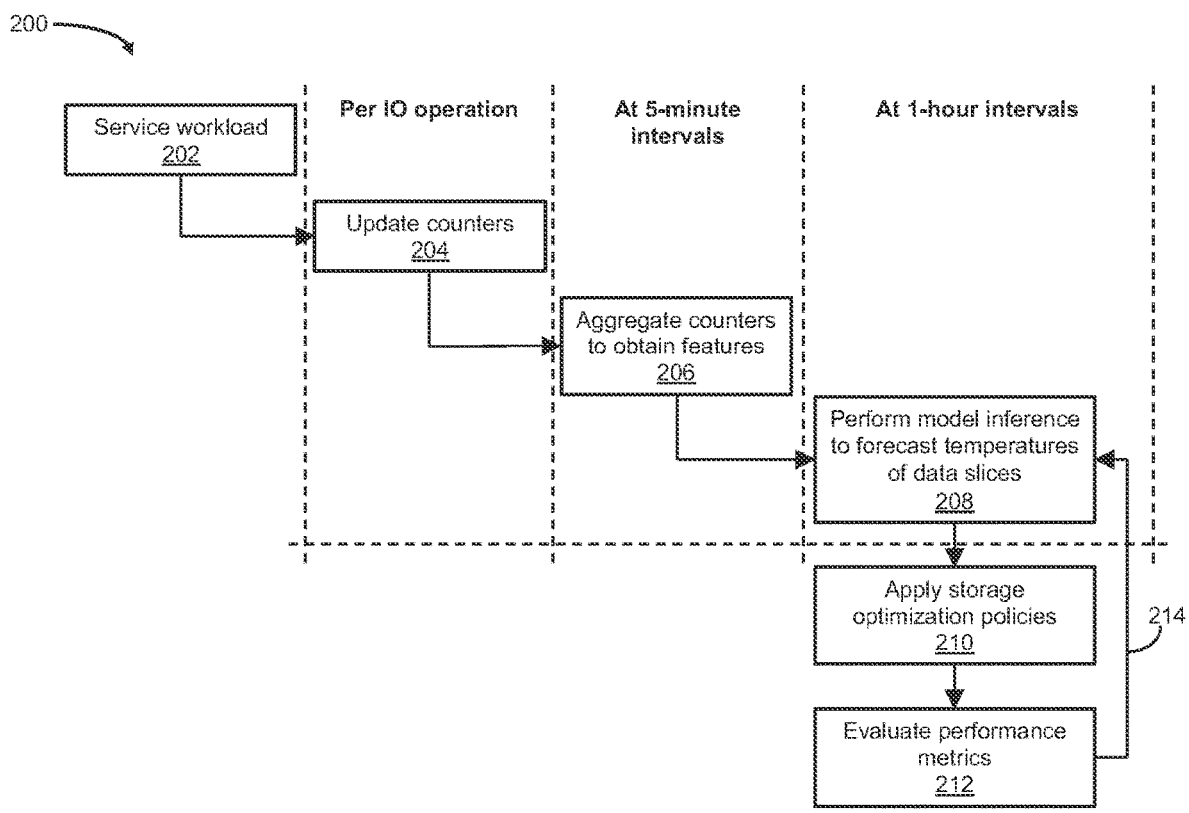
FIG. 2 is a diagram of an exemplary flow of actions or operations that can be performed by the storage system of FIG. 1a using the plurality of ML models of FIG. 1b and the plurality of data buckets FIG. 1b.

The disclosed techniques for forecasting temperatures of storage objects in a storage system using machine learning (ML) will be further understood with reference to the following illustrative example and FIGS. 1a, 1b, and 2. In this example, it is assumed that the disclosed techniques can forecast temperatures of some or all data slices maintained on the storage devices 120 of the tiered storage array 114 in the storage system 104. It is further assumed that the disclosed techniques can generate a plurality of features for each data slice at 5-minute intervals (or any other suitable time interval) and forecast the temperatures of the data slices by model inference at 1-hour intervals (or any other suitable time interval).

In this example, the storage system 104 services multiple storage IO requests (e.g., read IO requests, write IO requests) issued by one or more of the storage clients 102 (see FIG. 1). In response to the storage IO requests, the storage system 104 performs IO operations (e.g., read IO operations, write IO operations) that cause data elements (e.g., data blocks) to be read from and/or written to the data slices maintained on the storage devices 120 of the tiered storage array 114. For example, each data slice may have a size of 256 megabytes (Mb) or any other suitable size. For each IO operation performed on a data slice, the storage system 104 captures statistics associated with the IO operation such as a storage client identifier (ID), a volume ID, a logical unit number, a timestamp, an IO command (e.g., SCSI read command, SCSI write command), a logical block address (LBA) of the data slice, an IO size (e.g., read IO size, write IO size), an indication of an IO pattern (e.g., random IO pattern, sequential IO pattern), and so on.

In addition, for each IO operation performed on a data slice, the feature generator 128 updates (e.g., increments/decrements) at least some of the plurality of counters 132 (see FIG. 1b), which, at the end of each 5-minute interval, are used to generate a plurality of features relevant to the temperature of the data slice. In this example, the plurality of features include at least the number of IO operations per second (IOPS) performed on a data slice, the number of read IO operations performed on the data slice, the number of write IO operations performed on the data slice, the number of non-IO operations performed on the data slice, the percentage of the number of IO operations that are read IO operations, the percentage of the number of IO operations that are write IO operations, and the percentage of the number of IO and non-IO operations that are non-IO operations. During each 5-minute interval, the feature generator 128 updates the counters 132 to maintain running counts of the number of IOPS performed on the data slice, the number of read IO operations performed on the data slice, the number of write IO operations performed on the data slice, and the number of non-IO operations performed on the data slice, for that 5-minute time interval. At the end of each 5-minute interval, the feature generator 128 generates a plurality of features for the data slice by aggregating the updated counters 132 and performing feature engineering calculations such as those necessary to obtain the percentages pertaining to the number of read IO operations, the number of write IO operations, and the number of non-IO operations.

Each plurality of features generated for a data slice forms a dataset that can be applied as input to the ML models 124 to produce values for the target variables 126. To control variability in the datasets, each dataset is assigned to one of the plurality of data buckets 130. In this example, each dataset is assigned to one of eight (8) data buckets 1-8, each of which corresponds to an exemplary range of data slice temperatures defined in terms of average total B/W with values represented in logical units (e.g., 512 bytes), as illustrated in the TABLE below:

TABLE

| Data Buckets (1-8) | Total B/W Range (log values) |
|---|---|
| 1 | Less than 3 |
| 2 | 3 to 10 |
| 3 | 10 to 32 |
| 4 | 32 to 100 |

TABLE-continued

| Data Buckets (1-8) | Total B/W Range (log values) |
|---|---|
| 5 | 100 to 316 |
| 6 | 316 to 1000 |
| 7 | 1000 to 3162 |
| 8 | Greater than 3162 |

For example, in the TABLE above, data bucket "1" may contain less than 1,000 logical units, so the log value for the corresponding total B/W range may be less than $\log_{10}(1,000)$ or "3." In this example, datasets for a majority of the data slices (e.g., about 95%) are assigned to data buckets 1-5, and datasets for a small minority of data slices (e.g., about 5%) are assigned to 20 data buckets 6-8. In other words, most of the data slices maintained on the storage devices 120 of the tiered storage array 114 are less active (e.g., cold or colder), and few of the data slices maintained on the storage devices 120 of the tiered storage array 114 are more active (e.g., hot or hotter). It is noted that, in this example, a plurality of features for each data slice are generated at the end of each 5-minute interval, thereby generating twelve (12) historical values for each feature during each 1-hour interval.

Before using any of the datasets assigned to the data buckets 1-8 for forecasting temperatures of data slices, the data in each data bucket 1-8 (i.e., data slices, features, feature values) is split into training data, validation data, and testing data for the ML algorithms 134, which are used to generate the ML models 124. In this example, six (6) ML models 1-6 are configured to produce values for six (6) target variables 1-6, respectively, namely, the total number of IO operations per second (or "total IOPS") performed on a data slice, the number of read IO operations per second (or "read IOPS") performed on the data slice, the number of write IO operations per second (or "write IOPS") performed on the data slice, the total bandwidth (or "total B/W") associated with the data slice, the read bandwidth (or "read B/W") associated with the data slice, and the write bandwidth (or "write B/W") associated with the data slice. Accordingly, for each data bucket 1-8, the six (6) ML models 1-6 are generated for producing values for the six (6) target variables 1-6 (e.g., total IOPS, read IOPS, write IOPS, total B/W, read B/W, write B/W), respectively.

In this example, to facilitate training, validation, and testing of the ML algorithms 134, automated machine learning (or "AutoML") techniques are used to determine the most favorable ML algorithms and hyperparameter settings for each data bucket 1-8. For example, for each data bucket 1-8, AutoML techniques may determine that the random forest algorithm (or any other suitable ML algorithm) with a particular hyperparameter setting and the gradient boosting algorithm (or any other suitable ML algorithm) with another particular hyperparameter setting are the most favorable ML algorithms and hyperparameter settings for the data bucket. Further, for each data bucket 1-8, AutoML techniques may combine the random forest algorithm and the gradient boosting algorithm based on a suitable weighted average. In this example, two (2) ML algorithms 1-2 are determined using AutoML techniques (e.g., random forest algorithm, gradient boosting algorithm) and trained periodically (e.g., every 1, 2, 3 or more hours) to generate weighted-average ML models 1-6 for each data bucket 1-8. Alternatively, or in addition, AutoML techniques can be used periodically (e.g., daily, weekly, monthly) to redetermine the most favorable ML algorithms and hyperparameter settings for each data bucket 1-8. For each data bucket 1-8, the training data for the respective ML algorithms 1-2 can take the form of a table, in which data slices correspond to rows of the table and features relevant to the temperatures of the data slices correspond to columns of the table.

FIG. 2 depicts an exemplary flow of actions or operations performed by the storage system 104 once the ML models 1-6 for each data bucket 1-8 have been generated. As depicted in block 202, the storage system 104 services a workload of storage IO requests (e.g., read IO requests, write IO requests) issued by one or more of the storage clients 102. In response to the storage IO requests, the storage system 104 performs IO operations (e.g., read IO operations, write IO operations) that cause data elements (e.g., data blocks) to be read from and/or written to the data slices maintained on the storage devices 120 of the tiered storage array 114. Per IO operation performed on each data slice, the storage system 104 captures statistics associated with the IO operation. Further, as depicted in block 204, per IO operation performed on each data slice, the feature generator 128 updates at least some of the plurality of counters 132 used to generate the plurality of features relevant to the temperature of the data slice (e.g., the number of IOPS, the number of read IO operations, the number of write IO operations, the number of non-IO operations, the percentage of the total number of IO operations that are read IO operations, the percentage of the total number of IO operations that are write IO operations, and the percentage of the total number of IO and non-IO operations that are non-IO operations).

As depicted in block 206, at 5-minute intervals, the feature generator 128 aggregates the updated counters 132 to generate the plurality of features for each data slice, including performing feature engineering calculations such as those necessary to obtain the percentages pertaining to the number of read IO operations, the number of write IO operations, and the number of non-IO operations. Alternatively, or in addition, the feature generator 128 can perform such aggregation of the counters 132 if the storage system 104 runs out of memory space for the updated counters 132. The feature generator 128 assigns each dataset formed by each generated plurality of features to one of the eight (8) data buckets 1-8 based on the total B/W associated with the data slice.

At 1-hour intervals, slice data assigned to each data bucket 1-8 is tabulated (e.g., rows of data slices, columns of features) and applied as input to the ML models 1-6 for the data bucket. Further, as depicted in block 208, the ML models 1-6 for the data bucket perform model inference to forecast temperatures of some or all of the data slices, as desired and/or required. As described herein, for each data bucket 1-8, the six (6) ML models 1-6 are generated for producing the values for the six (6) target variables 1-6 (e.g., total IOPS, read IOPS, write IOPS, total B/W, read B/W, write B/W), respectively, each of which corresponds to a specified temperature definition for the data slices. In addition, at any suitable time(s), the storage system 104 applies or updates storage optimization policies based on the forecasted temperatures of the data slices, as depicted in block 210, and evaluates certain performance metrics (e.g., average IO latency, average IOPS, average bandwidth) resulting from the application of the storage optimization policies, as depicted in block 212.

As further described herein, most of the data slices maintained on the storage devices 120 of the tiered storage array 114 are less active (e.g., cold or colder), and few of the data slices maintained on the storage devices 120 of the tiered storage array 114 are more active (e.g., hot or hotter). In this example, datasets for the hot or hotter data slices may be assigned to data buckets 6-8, while datasets for the cold or colder data slices may be assigned to data buckets 1-5. For example, the storage optimization policies may focus on the smaller number of hot or hotter data slices stored in the tiered storage array 114 to assure that storage optimization techniques such as data tiering and/or data prefetching are performed on those data slices most effectively. Regarding data tiering, the data slices can be promoted or demoted to a different storage tier of the tiered storage array 114. Regarding data prefetching, entries in the cache 116 can be updated or invalidated in accordance with a suitable cache replacement policy (e.g., least recently used (LRU), most recently used (MRU)). Once the storage optimization policies are applied and the resulting performance metrics are evaluated, the storage system 104 provides feedback (as illustrated at reference numeral 214; see FIG. 2) based on the performance metric evaluation. For example, if the performance of the storage system 104 is deemed to be suboptimal based on the performance metric evaluation, then the feedback 214 may direct the system or a system administrator to vary a frequency of forecasting temperatures of data slices, retrain one or more of the ML algorithms 1-2 used to generate the ML models 1-6 for one or more of the data buckets 1-8, adjust at least one system operational parameter (e.g., the size of the cache 116), and/or any other suitable action or operation.

Figure 3:
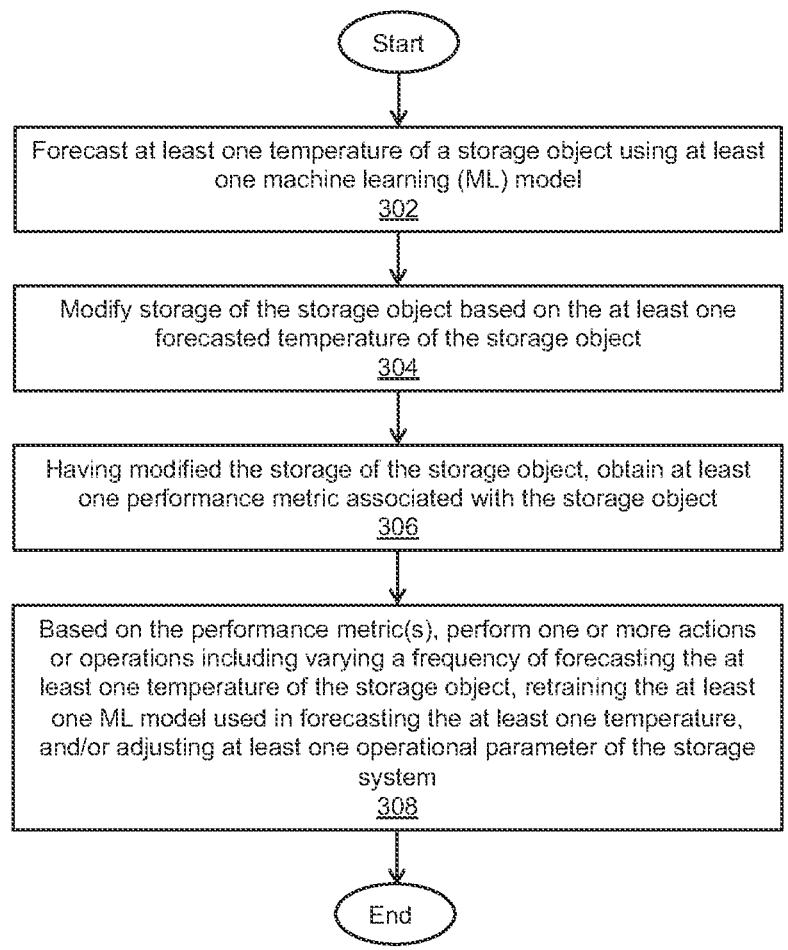
FIG. 3 is a flow diagram of an exemplary method of forecasting temperatures of storage objects in a storage system using machine learning (ML).

An exemplary method of forecasting temperatures of storage objects in a storage system using machine learning (ML) is described below with reference to FIG. 3. As depicted in block 302, at least one temperature of a storage object is forecasted using at least one ML model. As depicted in block 304, storage of the storage object is modified based on the at least one forecasted temperature of the storage object. As depicted in block 306, having modified the storage of the storage object, at least one performance metric associated with the storage object is obtained. As depicted in block 308, based on the performance metric(s), one or more actions or operations are performed including varying a frequency of forecasting the at least one temperature of the storage object, retraining the at least one ML model used in forecasting the at least one temperature, and/or adjusting at least one operational parameter of the storage system.

Having described the above illustrative embodiments, various alternative embodiments and/or variations may be made and/or practiced. For example, it was described herein with reference to the illustrative example that each data slice may have a size of 256 Mb. In an alternative embodiment, the disclosed techniques for forecasting temperatures of storage objects using machine learning (ML) can be used with data slices or other storage objects having sizes of 4 Mb, 8 Mb, 16 Mb, 32 Mb, 64 Mb, 128 Mb, 512 Mb, or any other suitable size and still provide increased accuracy over known statistical approaches to forecasting temperatures of storage objects.

It was also described herein with reference to the illustrative example that if the performance of the storage system 104 is deemed suboptimal based on a performance metric evaluation, then the system or a system administrator may be directed to retrain the ML algorithms 134 used to generate the ML models 124 for the data buckets 130. In an alternative embodiment, the ML algorithms 134 can be retrained for all data slices and/or all data buckets 130 in the storage system 104. In another alternative embodiment, the ML algorithms 134 can be retrained for one or more specified data slices and/or one or more specified data buckets 130 in the storage system 104. In still another alternative embodiment, the ML algorithms 134 can be retrained regularly or periodically such as every several hours, daily, weekly, monthly, and so on.

It was also described herein with reference to the illustrative example that the storage optimization policies applied by the storage system 104 may focus on a relatively small number of hot or hotter data slices stored in the tiered storage array 114 to assure that storage optimization techniques such as data tiering (e.g., data promotion/demotion) are performed on those data slices most effectively. It is noted that if a data slice or other storage object were demoted (e.g., placed in a lower storage tier that uses low-speed HDDs) in response to application of a storage optimization policy, then lower numbers of read IO operations, write IO operations, and/or IO operations per second (IOPS) may subsequently be performed on the data slice simply because it is being maintained on a low-speed HDD(s). In this case, the temperature of the data slice on the low-speed HDD(s) may have transitioned from cold to hot. However, because the data slice is performing lower numbers of IO operations, the storage system 104 may persist in treating it as a cold data slice. In an alternative embodiment, the temperature definitions for data slices or other storage objects can be specified, modified, and/or evaluated based on the type of storage media (e.g., fast SSDs, slower HDDs) upon which the data slices are stored. For example, a data slice stored on a fast SSD(s) may perform up to 200,000 IOPS and be regarded as a hot data slice, while another data slice stored on a slower HDD(s) may have transitioned from cold to hot but be limited to performing no more than 20,000 IOPS. In this alternative embodiment, the temperature definition for a data slice can be specified, modified, or evaluated differently if the data slice is either demoted from fast SSD storage to slower HDD storage or promoted from slower HDD storage to fast SSD storage. For example, the temperature definition for a hot data slice may be decreased from 200,000 IOPS to 20,000 IOPS following a demotion from fast SSD storage to slower HDD storage, and increased from 20,000 IOPS to 200,000 IOPS following a promotion from slower HDD storage to fast SDD storage. Further, the ML models 124 may be configured to take such modifications of the temperature definition into account when producing values for the target variables 126.

It was also described herein with reference to the illustrative example that at 5-minute intervals (or any other suitable time interval), the feature generator 128 can aggregate the counters 132 to generate or calculate a plurality of features for each data slice, and at 1-hour intervals (or any other suitable time interval), slice data can be tabulated and applied as input to the ML models 124. In an alternative embodiment, the aggregation of the counters 132 and the generation or calculation of the features can be performed in a "just-in-time" fashion for the ML models 124. In other words, such counter aggregation and feature generation for data slices can be performed only at the time when they become necessary for forecasting temperatures of the data slices using the ML models 124.

It was also described herein with reference to the illustrative example that for each of the data buckets 130, the ML models 124 are generated for producing values for the target (or predictor) variables 126 (e.g., total IOPS, read IOPS, write IOPS, total B/W, read B/W, write B/W), each of which corresponds to a specified temperature definition for the data slices. It is noted that such values of the target variables can simply be provided to the storage system 104, which can then use them in its decision-making regarding storage optimization techniques such as data tiering, data prefetching, load balancing, and so on. Indeed, the storage system 104 may use the values of the target variables differently for each respective storage optimization technique.

Several definitions of terms are provided below for the purpose of aiding the understanding of the foregoing description, as well as the claims set forth herein.

As employed herein, the term "storage system" is intended to be broadly construed so as to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write data.

As employed herein, the term "storage device" may refer to a storage array including multiple storage devices. Such a storage device may refer to any non-volatile memory (NVM) device including hard disk drives (HDDs), solid state drives (SSDs), flash devices (e.g., NAND flash devices, NOR flash devices), and/or similar devices that may be accessed locally and/or remotely (e.g., via a storage attached network (SAN)). A storage array (drive array, disk array) may refer to a data storage system used for block-based, file-based, or object storage. Storage arrays can include, for example, dedicated storage hardware containing HDDs, SSDs, and/or all-flash drives. A data storage entity may be any one or more of a filesystem, an object storage, a virtualized device, a logical unit (LU), a logical unit number (LUN), a volume (VOL), a logical volume (LV), a logical device, a physical device, and/or a storage medium. An LU may be a logical entity provided by a storage system for accessing data from the storage system and may be used interchangeably with a logical volume. An LU or LUN may be used interchangeably with each other. A LUN may be a logical unit number for identifying an LU and may also refer to one or more virtual disks or virtual LUNs, which may correspond to one or more virtual machines. A physical storage unit may be a physical entity such as a drive, a disk, or an array of drives or disks for storing data in storage locations that can be accessed by addresses. A physical storage unit may be used interchangeably with a physical volume.

As employed herein, the term "storage medium" may refer to one or more storage media such as a hard drive, a combination of hard drives, flash storage, a combination of flash storages, a combination of hard drives, flash storage, and other storage devices, or any other suitable types or combinations of computer readable storage media. A storage medium may also refer to both physical and logical storage media, include multiple levels of virtual-to-physical mappings, and include an image or disk image. A storage medium may be computer-readable and may be referred to as a computer-readable program medium.

As employed herein, the term "IO request" or simply "IO" may be used to refer to an input or output request such as a data read request or data write request.

As employed herein, the terms, "such as," "for example," "e.g.," "exemplary," and variants thereof describe non-limiting embodiments and mean "serving as an example, instance, or illustration." Any embodiments described herein using such phrases and/or variants are not necessarily to be construed as preferred or more advantageous over other embodiments, or to exclude the incorporation of features from other embodiments. In addition, the term "optionally" is employed herein to mean that a feature or process, etc., is provided in certain embodiments and not provided in other embodiments. Any embodiment of the present disclosure may include a plurality of "optional" features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method comprising:
    forecasting at least one temperature of a storage object using at least one machine learning (ML) model;
    modifying storage of the storage object based on the at least one forecasted temperature of the storage object;
    having modified storage of the storage object, obtaining at least one performance metric associated with the storage object; and
    based on the at least one performance metric, performing one or more of varying a frequency of forecasting the at least one temperature of the storage object, retraining the at least one ML model used in forecasting the at least one temperature, and adjusting at least one operational parameter of the storage system,
    wherein forecasting at least one temperature of a storage object includes processing, using the at least one ML model, a plurality of features relevant to the at least one temperature of the storage object, the plurality of features including two or more of:
    an average difference between start logical block addresses ("average delta LBA") of successive input/output (IO) operations performed on the storage object;
    an average delta LBA of successive read IO operations performed on the storage object;
    an average delta LBA of successive write IO operations performed on the storage object;
    a percentage of successive pairs of IO operations performed on the storage object that include two read IO operations;
    a percentage of successive pairs of IO operations performed on the storage object that include a read IO operation followed by a write IO operation;
    a percentage of successive pairs of IO operations performed on the storage object that include a write IO operation followed by a read IO operation;
    a percentage of successive pairs of IO operations performed on the storage object that include two write IO operations;
    a percentage of successive pairs of read IO operations performed on the storage object in which a start LBA of a second read IO operation immediately follows an end LBA of a first read IO operation; and
    a percentage of successive pairs of write IO operations performed on the storage object in which a start LBA of a second write IO operation immediately follows an end LBA of a first write IO operation.

2. The method of claim 1 wherein forecasting at least one temperature of a storage object includes forecasting a plurality of temperatures of the storage object using a plurality of ML models, respectively.

3. The method of claim 2 further comprising:
    producing a plurality of target variables by the plurality of ML models, respectively, the plurality of target variables corresponding to the plurality of temperatures of the storage object, respectively, wherein the plurality of target variables further correspond to a plurality of temperature definitions, respectively, each temperature definition defining a different manner of expressing a temperature of a storage object.

4. The method of claim 2 wherein one or more input/output (IO) operations are performed on the storage object over a plurality of first time intervals, and wherein the method further comprises:
for each IO operation performed on the storage device during each first time interval, updating one or more in-memory counters.

5. The method of claim 4 further comprising:
at an end of each first time interval, generating the plurality of features relevant to the at least one temperature of the storage object by aggregating the updated in-memory counters,
wherein the plurality of features include:
a number of IO operations per second (IOPS) performed on the storage object;
a number of read IO operations performed on the storage object;
a number of write IO operations performed on the storage object;
an average time between successive arrivals ("average interarrival time") of the IO operations performed on the storage object;
an average interarrival time of the read IO operations performed on the storage object; and
an average interarrival time of the write IO operations performed on the storage object.

6. The method of claim 5 wherein the plurality of features generated at the end of each first time interval forms an input dataset for the plurality of ML models, and wherein the method further comprises:
assigning each input dataset to one of a plurality of data buckets,
wherein each data bucket corresponds to a different range of temperatures of a storage object.

7. The method of claim 6 further comprising:
for each data bucket, training the plurality of ML models using at least some input datasets assigned to the data bucket.

8. The method of claim 6 wherein forecasting a plurality of temperatures of the storage object using a plurality of ML models, respectively, includes, for each data bucket at an end of each of a plurality of second time intervals, (i) applying input datasets assigned to the data bucket to the plurality of ML models, and (ii) producing a plurality of target variables by the plurality of ML models, respectively, the plurality of target variables corresponding to the plurality of temperatures of the storage object, respectively,
wherein the plurality of target variables further correspond to a plurality of temperature definitions, each temperature definition defining a different manner of expressing a temperature of a storage object.

9. The method of claim 8 wherein modifying storage of the storage object includes applying one or more storage optimization policies based on the forecasted plurality of temperatures of the storage object.

10. The method of claim 9 wherein obtaining at least one performance metric associated with the storage object includes evaluating the at least one performance metric resulting from application of the one or more storage optimization policies.

11. A system comprising:
a memory; and
processing circuitry configured to execute program instructions out of the memory to:
forecast at least one temperature of a storage object using at least one machine learning (ML) model;
modify storage of the storage object based on the at least one forecasted temperature of the storage object;
having modified storage of the storage object, obtain at least one performance metric associated with the storage object; and
based on the at least one performance metric, perform one or more of varying a frequency of forecasting the at least one temperature of the storage object, retraining the at least one ML model used in forecasting the at least one temperature, and adjusting at least one operational parameter of the storage system,
wherein the processing circuitry is configured to execute the program instructions out of the memory to forecast the at least one temperature of the storage object including processing, using the at least one ML model, a plurality of features relevant to the at least one temperature of the storage object, the plurality of features including two or more of:
an average difference between start logical block addresses ("average delta LBA") of successive input/output (IO) operations performed on the storage object;
an average delta LBA of successive read IO operations performed on the storage object;
an average delta LBA of successive write IO operations performed on the storage object;
a percentage of successive pairs of IO operations performed on the storage object that include two read IO operations;
a percentage of successive pairs of IO operations performed on the storage object that include a read IO operation followed by a write IO operation;
a percentage of successive pairs of IO operations performed on the storage object that include a write IO operation followed by a read IO operation;
a percentage of successive pairs of IO operations performed on the storage object that include two write IO operations;
a percentage of successive pairs of read IO operations performed on the storage object in which a start LBA of a second read IO operation immediately follows an end LBA of a first read IO operation; and
a percentage of successive pairs of write IO operations performed on the storage object in which a start LBA of a second write IO operation immediately follows an end LBA of a first write IO operation.

12. The system of claim 11 wherein the processing circuitry is further configured to execute the program instructions out of the memory to forecast a plurality of temperatures of the storage object using a plurality of ML models, respectively.

13. The system of claim 12 wherein the memory includes a plurality of counters, wherein one or more input/output (IO) operations are performed on the storage object over a plurality of first time intervals, and wherein the processing circuitry is further configured to execute the program instructions out of the memory, for each IO operation performed on the storage device during each first time interval, to update at least some of the plurality of counters.

14. The system of claim 13 wherein the processing circuitry is further configured to execute the program instructions out of the memory, at an end of each first time interval, to generate the plurality of features relevant to the at least one temperature of the storage object by aggregating the updated plurality of counters, wherein the plurality of features include at least a number of IO operations per second (IOPS) performed on the storage object, a number of read IO operations performed on the storage object, and a number of write IO operations performed on the storage object.

15. The system of claim 14 wherein the plurality of features further include at least some of:

an average time between successive arrivals ("average interarrival time") of the IO operations performed on the storage object;

an average interarrival time of the read IO operations performed on the storage object; and an average interarrival time of the write IO operations performed on the storage object.

16. The system of claim 14 wherein the plurality of features generated at the end of each first time interval forms an input dataset for the plurality of ML models, and wherein the processing circuitry is further configured to execute the program instructions out of the memory to assign each input dataset to one of a plurality of data buckets, wherein each data bucket corresponds to a different range of temperatures of a storage object.

17. The system of claim 16 wherein the processing circuitry is further configured to execute the program instructions out of the memory, for each data bucket at an end of each of a plurality of second time intervals, to apply input datasets assigned to the data bucket to the plurality of ML models, and to produce a plurality of target variables by the plurality of ML models, respectively, the plurality of target variables corresponding to the plurality of temperatures of the storage object, respectively, wherein the plurality of target variables further correspond to a plurality of temperature definitions, each temperature definition defining a different manner of expressing a temperature of a storage object.

18. The system of claim 17 wherein the processing circuitry is further configured to execute the program instructions out of the memory to apply one or more storage optimization policies based on the forecasted plurality of temperatures of the storage object, and to evaluate the at least one performance metric resulting from application of the one or more storage optimization policies.

19. A computer program product including a set of non-transitory, computer-readable media having instructions that, when executed by processing circuitry, cause the processing circuitry to perform a method comprising:

forecasting at least one temperature of a storage object using at least one machine learning (ML) model;

modifying storage of the storage object based on the at least one forecasted temperature of the storage object;

having modified storage of the storage object, obtaining at least one performance metric associated with the storage object; and based on the at least one performance metric, performing one or more of varying a frequency of forecasting the at least one temperature of the storage object, retraining the at least one ML model used in forecasting the at least one temperature, and adjusting at least one operational parameter of the storage system, wherein forecasting at least one temperature of a storage object includes processing, using the at least one ML model, a plurality of features relevant to the at least one temperature of the storage object, the plurality of features including two or more of:

an average difference between start logical block addresses ("average delta LBA") of successive input/output (IO) operations performed on the storage object;

an average delta LBA of successive read IO operations performed on the storage object;

an average delta LBA of successive write IO operations performed on the storage object;

a percentage of successive pairs of IO operations performed on the storage object that include two read IO operations;

a percentage of successive pairs of IO operations performed on the storage object that include a read IO operation followed by a write IO operation;

a percentage of successive pairs of IO operations performed on the storage object that include a write IO operation followed by a read IO operation;

a percentage of successive pairs of IO operations performed on the storage object that include two write IO operations;

a percentage of successive pairs of read IO operations performed on the storage object in which a start LBA of a second read IO operation immediately follows an end LBA of a first read IO operation; and a percentage of successive pairs of write IO operations performed on the storage object in which a start LBA of a second write IO operation immediately follows an end LBA of a first write IO operation.

20. The computer program product of claim 19 wherein forecasting at least one temperature of a storage object includes forecasting a plurality of temperatures of the storage object using a plurality of ML models, respectively, and wherein the method further comprises:

producing a plurality of target variables by the plurality of ML models, respectively, the plurality of target variables corresponding to the plurality of temperatures of the storage object, respectively, wherein the plurality of target variables further correspond to a plurality of temperature definitions, respectively, each temperature definition defining a different manner of expressing a temperature of a storage object.

\* \* \* \* \*